United States Patent [19]

Metz

[11] 4,361,135

[45] Nov. 30, 1982

[54] COOPERATIVE HEAT TRANSFER AND GROUND COUPLED STORAGE SYSTEM

[75] Inventor: Philip D. Metz, Rocky Point, N.Y.

[73] Assignee: The United States of America as represented by the United States Department of Energy, Washington, D.C.

[21] Appl. No.: 224,233

[22] Filed: Jan. 12, 1981

Related U.S. Application Data

[63] Continuation of Ser. No. 37,077, May 8, 1979, abandoned.

[51] Int. Cl.³ .......................... F24J 3/02; F25D 23/12
[52] U.S. Cl. ..................................... 126/437; 62/260; 126/400; 126/436; 165/45
[58] Field of Search ................... 62/260; 126/400, 427, 126/436, 437, 430; 165/29, 18, 45

[56] References Cited

U.S. PATENT DOCUMENTS

| | | | |
|---|---|---|---|
| 2,181,953 | 12/1939 | Usselman | 165/45 |
| 2,529,154 | 11/1950 | Hammond et al. | 126/430 |
| 3,339,629 | 9/1967 | Hervey | 165/45 |
| 3,996,759 | 12/1976 | Meckler | 126/400 |
| 4,042,012 | 8/1977 | Perry | 126/400 |
| 4,044,949 | 8/1977 | Morawetz et al. | 126/437 |
| 4,054,246 | 10/1977 | Johnson | 126/429 |
| 4,059,146 | 11/1977 | Gruniger | 165/45 |
| 4,060,988 | 12/1977 | Arnold | 165/45 |
| 4,137,720 | 2/1979 | Rex | 165/45 |
| 4,138,995 | 2/1979 | Yuan | 126/400 |
| 4,165,037 | 8/1979 | McCarson | 62/2 |

Primary Examiner—Daniel J. O'Connor

[57] ABSTRACT

A cooperative heat transfer and ground coupled storage system wherein collected solar heat energy is ground stored and permitted to radiate into the adjacent ground for storage therein over an extended period of time when such heat energy is seasonally maximally available. Thereafter, when said heat energy is seasonally minimally available and has propagated through the adjacent ground a substantial distance, the stored heat energy may be retrieved by a circumferentially arranged heat transfer means having a high rate of heat transfer.

10 Claims, 6 Drawing Figures

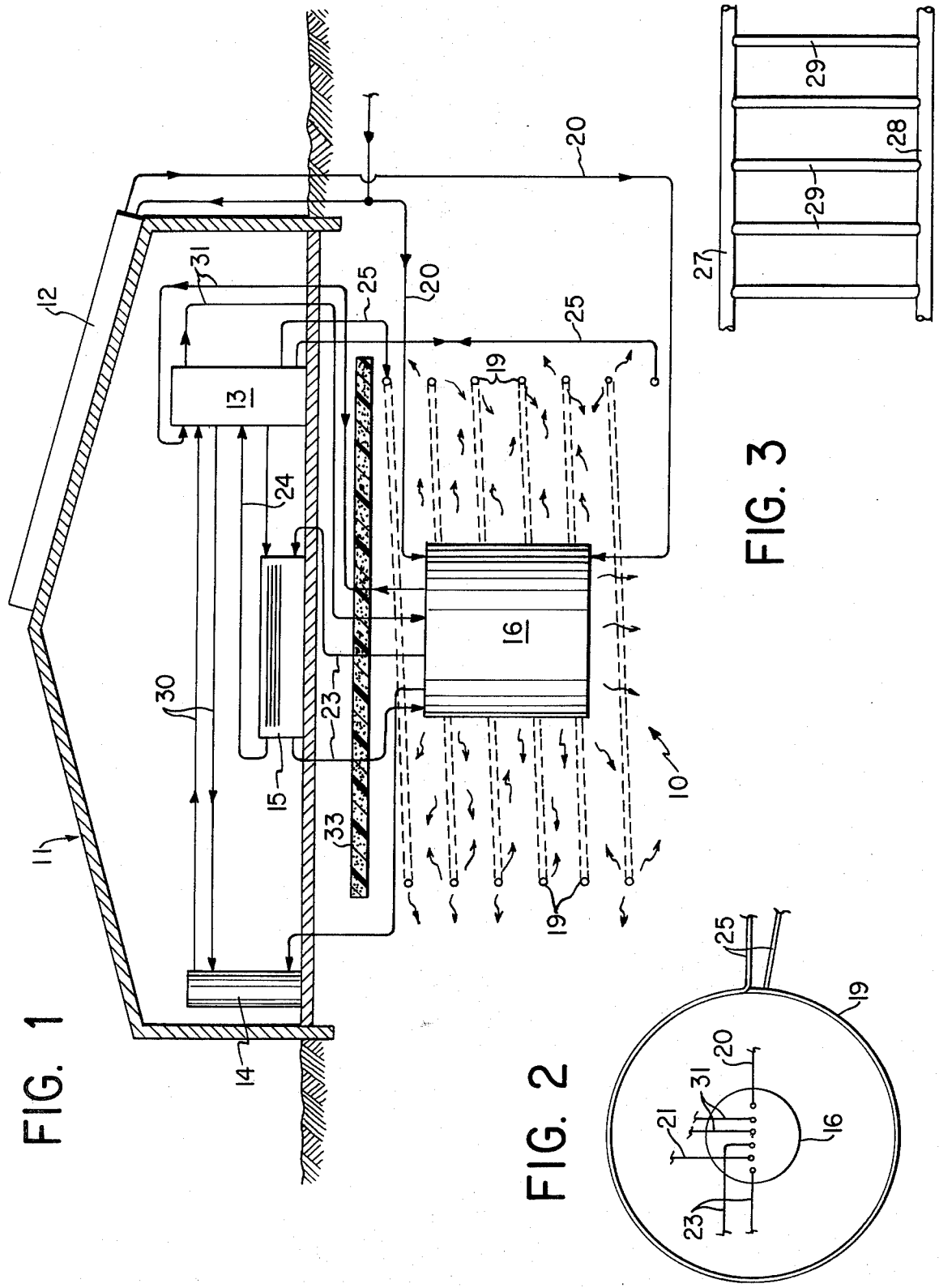

COOPERATIVE HEAT TRANSFER AND GROUND COUPLED STORAGE SYSTEM

BACKGROUND OF THE INVENTION

The invention described herein was made or conceived in the course of, or under a contract with, the U.S. Department of Energy.

This is a continuation, of application Ser. No. 37,077, filed May 8, 1979, now abandoned.

The present invention comprises improved means for ground storage of collected solar heat energy in spaced storage areas to provide a temperature heat sink ground coupled with a high heat energy transfer means which may also function as a low temperature heat sink. The use of a large mass of earth for the storage of collected solar heat energy is known. Such concepts may be seen in U.S. Pat. Nos. 3,339,629, 4,024,910 and 4,042,012. U.S. Pat. No. 4,049,407 teaches the placement of an evaporator coil connected to a heat pump radially intermediate adjacent coils which place heat into the ground. Thus far, such prior art devices have failed efficiently to utilize the ground storage of heat energy and have particularly failed efficiently to provide means for retrieval of such heat energy over a long period of time, and have failed to match efficiently the storage of collected solar energy as it varies from season to season with an efficient means of retrieval of such stored energy. It is the purpose of the present invention to disclose a system which solves these aforementioned problems.

SUMMARY OF THE INVENTION

The present invention seeks to take advantage of the fact that when heated energy is stored in the ground at relatively high temperatures, such energy gradually radiates outwardly and is stored at predictable temperature gradients in the ground surrounding the central heat sink. Collected solar heat energy may be stored, for example, during the summer and fall when such available heat energy is at its maximum in the central storage area or high temperature heat sink. In accordance with a particular embodiment of the invention, such energy may be stored as hot water contained within a storage tank, the water being in heat exchange relationship with respect to a fluid medium circulated through a solar collector.

Disposed at a prescribed distance in the ground generally circumferentially about the central high temperature heat sink is a heat transfer means capable of very efficiently transferring heat energy from the ground to a thermal load (for example, the evaporator of a heat pump). The circumferentially located heat transfer means may also serve to place heat into the ground when available but has as its primary function the retrieval of heat energy placed at a prescribed distance in the ground previously by the central high temperature heat sink. This energy may, for example, have been initially stored during the summer and fall and later be retrieved during the winter and spring by the heat transfer means when the wave of heat energy has reached the distantly spaced heat transfer means. In accordance with particular embodiments of the present invention, the latter may be a continuous coil of pipe or horizontal headers interconnected by vertical, parallel pipes spaced from the central heat sink a sufficient distance to provide ground coupling and heat retrieval with respect thereto. A particular feature of the invention is that the ground coupled heat storage system of the invention be used to provide a source of heat for a conventional heat pump and also to provide the heating or preheating of domestic hot water and of hot water for space heating. When the heat pump is used for summer cooling, by appropriate circulation, the circumferentially arranged heat transfer means may serve to cool the condensed fluid of the heat pump, thus effecting storage of heat in the ground for subsequent retrieval. These and other aspects of the present invention will be seen with reference to the following specification and the drawing.

BRIEF DESCRIPTION OF THE DRAWING

FIG. 1 is a side view partially in cross section illustrating the ground coupled heat storage energy transfer system of the present invention in conjunction with a thermal load, solar collector means and a heat pump:

FIG. 2 is a plan view of the ground coupled heat storage system of FIG. 1;

FIG. 3 illustrates an alternate embodiment of the heat energy transfer means of the present invention;

DESCRIPTION OF PREFERRED EMBODIMENTS

Figure 4:
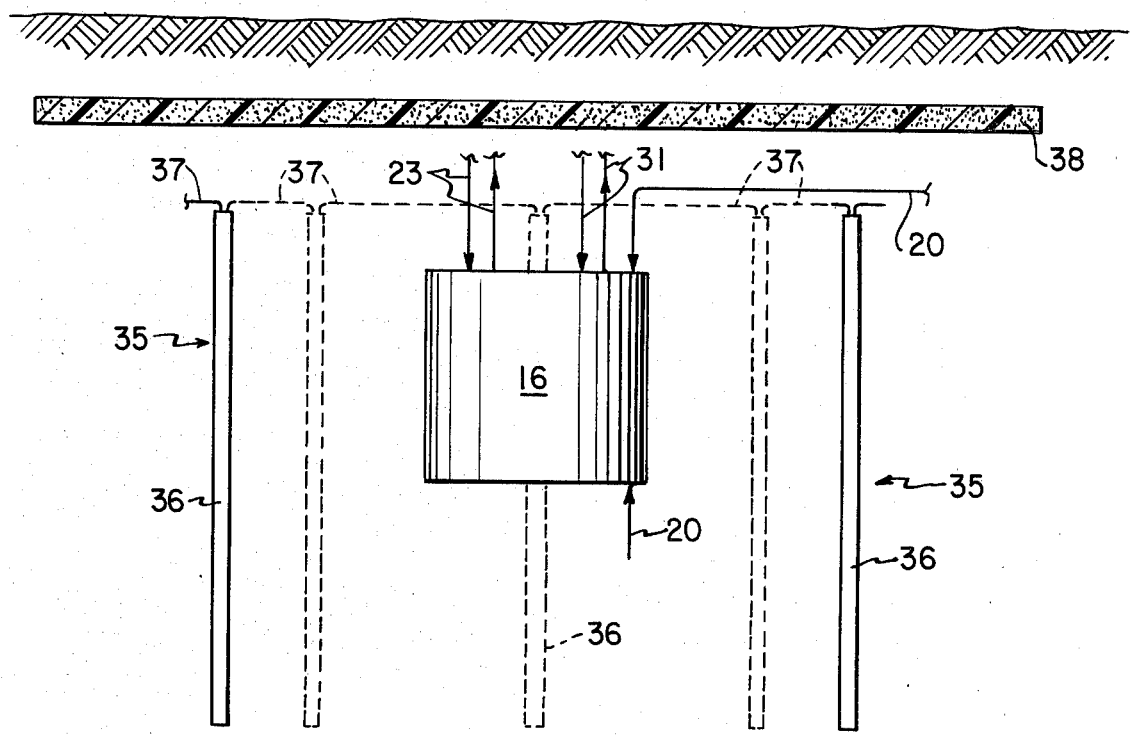
FIG. 4 is a side view partially in cross section of a ground coupled heat storage system of the present invention employing another alternate circumferentially arranged heat energy transfer means.

With reference to FIG. 1, a cooperative heat transfer and ground coupled storage system 10 in accordance with the principles of the present invention has been illustrated. For the purpose of describing the present invention within an appropriate environment, the system 10 is installed in conjunction with a structure 11 such as a house having a conventional roof mounted solar energy collector 12 and a heat pump 13. The latter, as is well known, by compression and evaporation of a heat transfer medium selectively may be used to heat or cool a thermal load. The heat generated by the heat pump may be used, for example, to heat domestic hot water 14 (see fluid connector lines 30) or may be circulated through hot water convectors 15 (lines 24) to heat the interior of the structure 11. Alternatively, in the summer by appropriate reversal of the cycle, the interior of the structure may be air conditioned.

In accordance with the present invention, a unique ground coupled storage system for collected heat energy has been devised which includes a centrally located heat energy storage means in the form of the tank 16. By way of example, the tank 16 will be composed of heavy-duty low corrosion steel or will be constructed of precast concrete rings. Where the thermal load is a house, the size of the tank 16 may be, for example, approximately 8 feet in diameter by 8 feet in length and will contain 3000 gallons of water. For purposes of domestic space conditioning, tank 16 should have a capacity of say, 2000 gallons to 4000 gallons. A much larger tank would be prohibitively expensive. The interior of the tank is connected with the solar collector 12 in order to transmit collected heat energy for storage in tank 16. The tank 16 may be buried in the ground above the water table adjacent to or beneath the structure 11 to be heated with approximately 4 feet of ground fill covering the tank.

Circumferentially arranged with respect to the tank 16 is a heat transfer and retrieval means 19, which in the embodiment described, may assume the form of a flexible, continuously coiled polyethelene pipe. The outside diameter of the pipe may be 1.5 inches or larger. The coils of the pipe are arranged vertically with respect to each other at a distance of say 20 feet from the center of the tank 16, each coil being vertically 2 feet to 3 feet apart, the total comprising a length of approximately 300 to 600 linear feet.

For simplicity is describing the interrelation between the above components, fluid connections between two or more such components have been indicated schematically and direction of flow is shown by the use of arrows. Circulating pumps and valving to achieve the indicated flows have been omitted.

Typically, in the summer and fall energy from the solar collector circulating through line 20 will be stored as heated water in the tank 16. Stored heated water from line 21 can be used if desired during this period as domestic hot water or can be used to preheat domestic hot water. So long as the temperature of heated water in tank 16 exceeds 100° F., it may also be used to provide interior heating by circulating the water directly through connector 22 through line 23. Primarily, however, tank 16 is intended to be used for heat storage at high temperatures when available solar energy is at its maximum. In the winter, heat will continue to be deposited in the tank 16 from the solar collector 12 when available and heat from the tank will be used to heat the thermal load directly through line 23 or through the agency of the heat pump 3 (lines 24) when needed. Such use will lower the tank temperature until it becomes relatively inefficient to use such heat as a source (below 40° F. as a source of heat for heat pump 13) although the heat stored in the tank 16 will be reinforced to some extent by retrieval of heat stored in the ground surrounding the tank 16.

During the summer, heat will be deposited in the ground through pipe 19 by the heat pump 13 through lines 25, the ground being cooler than the air at this time. However, in the winter, the wave of heat energy whose source is heat deposited in tank 16, will have travelled to the vicinity of circumferential heat transfer means 19. At this time, the circumferentially arranged heat transfer means 19 may be called upon to transfer heat continuously and over a long period as such heat is retrieved from the large ground mass intermediate the tank 16 and the heat transfer retrieval means 19. Such heat is available for use by the heat pump 13. Thus, heat placed in the ground during the summer and fall for storage in tank 16 is subsequently retrieved during the winter months by the peripheral heat transfer and retrieval means 19.

Figure 5:
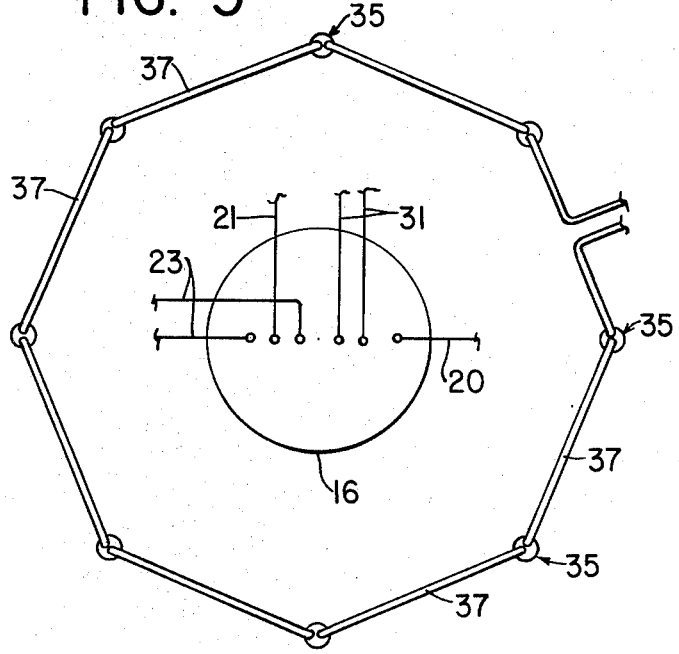
FIG. 5 is a plan view of the storage system of FIG. 4.
Figure 6:
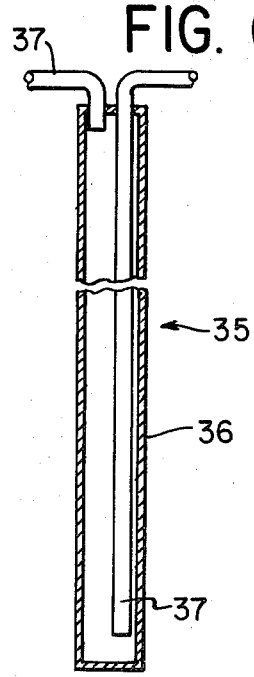
FIG. 6 is a detail showing the construction of one of the components of the alternate heat energy transfer means of FIGS. 4 and 5.

FIGS. 4-6 illustrate yet another embodiment which the circumferential heat transfer means of the present invention may assume. In this embodiment, with the tank 16 at the center of the ground coupled storage system, a plurality of deep wells 35 may be sunk vertically and equidistantly about 20 feet from the center of tank 16. In the illustrated embodiment, the upper ends of the wells 35 are below frost level and may extend for say 30 feet to 50 feet so long as the lower ends thereof remain above the water table. As indicated in FIG. 5, eight wells 35 are so arranged and will function to intercept the wave of heat energy from tank 16 as it propagates radially outwardly for subsequent retrieval of such energy, all as heretofore described. A heat transfer medium such as water may be circulated throughout the entire plurality of wells 35. FIG. 6 illustrates the construction of a typical well 35 having an outer casing 36 of steel or plastic whose diameter may be for example 2½ inches. Entering the top of each casing 36 is an inlet pipe 37 which introduces water into the casing 36 from an adjacent well 35. A second pipe 37 extending for substantially the length of casing 36 is adapted to withdraw water from the bottom of the casing 36 and to circulate the water into an adjacent well 35. By this means, heat energy absorbed by the respective casings 36 can be retrieved when desired.

As illustrated in connection with the embodiment of FIGS. 1 and 2, a polystyrene thermal shield or layer 33 overlies the entire ground coupled storage system. In this embodiment, the thermal shield acts to prevent a migration of stored heat energy upwardly into the overlying ground and as a dual function, acts to prevent escape of heat energy from the structure 18. In the embodiment of FIG. 4, which by way of contrast is located adjacent to a structure (not shown) to be space conditioned instead of underlying such structure, the shield 38 extends for some distance radially beyond the perimeter of the ground storage system. In this embodiment, since shield or layer 38 tends to be impervious to moisture, it can act not only to shield the storage system from thermal loss which may occur through the overlying ground, but also may shield the storage system from rain water or melting snow which could otherwise percolate downwardly through the system to cause the system's stored energy to be depleted.

The ground coupled heat storage and heat transfer and retrieval elements are specifically designed and configured to provide both long-term heat storage and also high heat transfer rates when needed. The result is a space conditioning system which uses less purchased energy and a smaller and less expensive solar system for a given load. Furthermore, more heat energy may be stored efficiently with less capital expense, such storage taking place during seasons when it is highly desirable to maximize heat storage, with subsequent inexpensive and highly efficient retrieval of stored energy which has migrated radially outwardly toward the heat transfer and retrieval means 19. Heat is effectively stored at high temperature at relatively low cost, and due to ground coupling and the use of surrounding earth as an inexpensive storage means, such trapped heat is later retrieved when needed.

FIG. 3 illustrates another alternate construction which the heat transfer and retrieval means 19 may assume. In this form, vertically spaced, horizontal headers 27 and 28 are arranged in parallel relationship with intermediate vertical tubes 29. Since flow through headers 27 and 28 is much shorter than the combined flow would be through vertical pipes 29, the temperature gradient within the headers is much lower than would occur through the continuous coil 19 as illustrated in FIG. 1. The advantage of the configuration of FIG. 3 is that much higher heat transfer rates are possible, while lower pump power would be required. A correlative benefit of this configuration is the possibility that a leaking pipe section might be jettisoned without seriously affecting the overall capacity of the system.

It will be understood that the foregoing description has been of particular embodiments and has been therefore representative. In order to appreciate fully the scope of the invention, reference should be made to the appended claims.

I claim:

1. A cooperative ground coupled heat storage and retrieval system comprising:
   (a) a tank capable of storing a substantial quantity of fluid, said tank being located in the ground below the freezing level and above the water table and being constructed to permit conduction of heat therefrom into the surrounding ground; and
   (b) circumferential heat transfer means for the transfer of heat to and from the ground surrounding said tank, said means further comprising a plurality of vertically arranged deep wells each consisting of a casing, fluid inlet means at the top of said casings, and fluid outlet means extending into said casings generally the entire length thereof to withdraw water from the bottom of said casings, and means for the interconnecting of the inlet and outlet means of said casings such that a fluid heat transfer medium may be circulated into the top of each casing and withdrawn from the bottom of said casing and transmitted into the top of an adjacent casing, said wells being constructed to allow the flow of heat between the ground and said heat transfer fluid and each being spaced a predetermined distance from said tank, said distance being selected so that heat deposited in said tank during the warmer, sunnier months and conducted into the ground will reach said wells during the cooler, darker months, whereby the heat may be retrieved for use as it is needed during the heating season.

2. A system as described in claim 1, wherein said predetermined distance is about 20 feet.

3. A system as described in claims 1 or 2, further comprising:
   (a) a solar energy collector;
   (b) means for transferring heat from said solar energy collector to a fluid stored in said tank;
   (c) a structure to be heated;
   (d) heat exchange means within said structure; and
   (e) means for circulating a fluid heat transfer medium between said heat exchange means and said circumferential heat transfer means, whereby heat may be transferred from the ground to said structure.

4. A system as described in claim 3, further comprising thermal shield means in the form of a layer of insulating material located above said tank and said circumferential heat transfer means for preventing the flow of heat upwards.

5. A system as described in claim 4, wherein said thermal shield means extends for a distance beyond the perimeter of said circumferential heat transfer means and is impervious to rain and melting snow to prevent the passage of water from above through the storage system.

6. A system as described in claim 4, wherein said heat exchange means includes means for heating hot water.

7. A system as described in claim 6, wherein said heat exchange means includes a heat pump.

8. A system as described in claim 7, further comprising means associated with said heat pump for circulating a fluid heat transfer medium heated by said heat pump into said circumferential heat transfer means to deposit heat into the ground surrounding said tank while cooling said structure.

9. A system as described in claim 3, wherein said fluid heat transfer medium is water, the tank is adapted to contain a quantity of water within about 2,000 to 4,000 gallons, and said circumferential heat transfer means extends for a distance vertically below the freezing level.

10. A system as described in claim 1, wherein said wells extend from 30 to 50 feet.

* * * * *